Dec. 10, 1957    A. F. ROTHWEILER    2,815,944
RESILIENT MOUNTING FOR WHEEL SUSPENSION
Filed Sept. 7, 1954
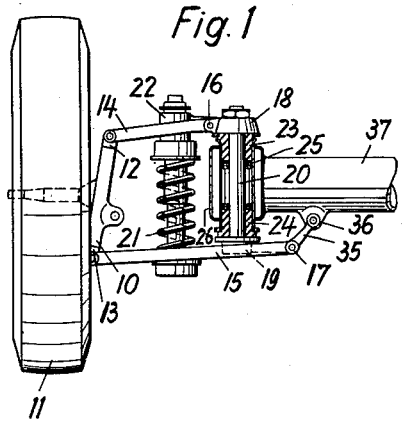
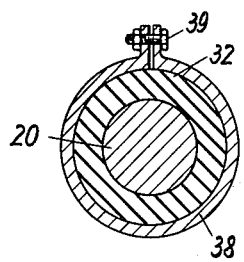
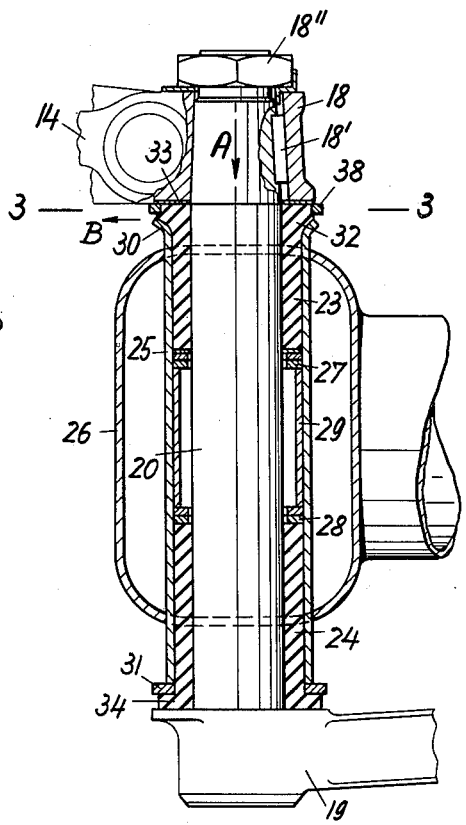
INVENTOR
ALFRED F. ROTHWEILER
BY Dicke and Gray
ATTORNEYS.

2,815,944

RESILIENT MOUNTING FOR WHEEL SUSPENSION

Alfred F. Rothweiler, Oberesslingen, Germany, assignor to Daimler-Benz Aktiengesellschaft, Stuttgart-Unterturkheim, Germany Application September 7, 1954, Serial No. 454,520

4 Claims. (Cl. 267—20)

The present invention relates to improvements in a resilient mounting, and more particularly to novel means for resiliently mounting an inner cylindrical element within an outer tubular element by means of a rubber cushion or sleeve designed to take up an axial force.

More specifically, the invention relates to a wheel suspension wherein the actual suspension mechanism is resiliently mounted on the automobile frame or the wheel axle thereof by means of a vertical journal secured within a tubular element mounted on the frame or axle, and being of slightly greater length than such tubular element, with at least one rubber sleeve interposed between the cylindrical wall of the journal and element, and extending slightly beyond at least one end of the latter and abutting with its end against a suitable surface which radially projects from the journal.

A resilient mounting of this type as frequently applied to automobiles prior to this invention has the serious disadvantage ordinarily not noticeable while the car is new that the vertical forces directed axially of the journal which the resilient mounting is intended to absorb or cushion, bear almost entirely upon the small, radially free portion of the rubber sleeve between the end of the tubular element and the projecting surface of the journal. Consequently, the rubber at such free portion is forced outwardly and deteriorates very quickly, and the mounting soon becomes insecure and loose, particularly in the axial direction thereof. Due to such construction, those parts of the rubber sleeve which press against the cylindrical walls of the journal and the tubular element, and which are intended to cooperate with the free end portion thereof to take up such axial forces do so only to an insignificant extent.

It is the primary object of the invention to overcome these disadvantages of the prior resilient mountings as described above by restraining the free end portion of the rubber sleeve in the outward direction by means of a suitable clamping ring so as to maintain the full resiliency of such end portion.

A complementary object of the invention consists in increasing the bearing strength of such end portion of the rubber sleeve, preferably by making it of flangelike shape.

Thus, the free end portion of the rubber sleeve between the tubular part of the frame or axle of the vehicle and the journal can no longer escape outwardly but is held compressed within the cylindrical walls, so that these walls will take up the axial forces, i. e. those acting in a vertical direction, as well.

A feature of the invention for carrying out these objects further resides in providing the tubular bearing element with a gradually expanding, inwardly well rounded end portion or flange so that it will not cut into the flanged end portion of the rubber sleeve but will provide a smooth bearing surface therefor, and the compressive force exerted upon the free end portion by the clamping ring will be transmitted to the main body of the rubber sleeve as evenly as possible.

Further objects, features, and advantages of the invention will appear from the following detailed description thereof and the accompanying drawings showing a preferred embodiment of the invention, and wherein—

Fig. 1 shows, partly in section, a diagrammatic elevational view of a wheel suspension and suspension mounting according to the invention;

Fig. 2 shows an enlarged section of the resilient mounting; while

Fig. 3 shows a section along line 3—3 of Fig. 2.

Referring particularly to the drawings, the wheel supporting element 10 of the front wheel 11 is mounted by pivots 12 and 13 on the arms 14 and 15 so as to permit a steering motion to be transmitted to the wheel 11. Arms 14 and 15, in turn, are mounted by pivots 16 and 17 on the brackets 18 and 19 of a vertical journal 20. The bracket 18 is secured to the journal 20 by means of a wedge or key 18' and a nut 18'', while the bracket 19 is preferably made integral with the journal 20. The resiliency imparted to the wheels is, as usually, provided by a coil spring 21, the lower end of which rests upon the lower arm 15, and the upper end upon a bell-shaped bearing element 22 which is integral with the bracket 18 or rigidly secured thereto.

The journal 20 is mounted by means of an upper rubber sleeve 23 and a lower rubber sleeve 24 in a tubular member 25 which is welded into a vertical aperture in the longitudinal frame member 26 of the vehicle. At their inner ends, the rubber sleeves 23 and 24 rest upon washers 27 and 28 which are spaced apart by a tubular sleeve 29. The upper end of the supporting tube 25 which projects above the longitudinal frame member 26 is bent outwardly to form a smoothly rounded shoulder or flange 30, whereas the lower end has a horizontal flange 31. Obviously, the flange 31 may also be rounded similar to the upper flange 30. Both rubber sleeves 23 and 24 also have thickened or flangelike outer ends 32 and 34 respectively, which are interposed between a washer 33 on the lower surface of the bracket 18 and the shoulder 30 on the upper end of the tube 25, and the flange 31 on the lower end of the tube 25 and the lower bracket 19 of the journal 20, respectively.

For supporting the journal 20 and for thus securing the entire wheel suspension against rotation about a vertical axis, the lower bracket 19 is provided with an extension arm 35, the end of which is secured by intermediate rubber cushions 36 on the transverse frame member or front axle 37.

The wheel suspension is assembled as follows:

After first inserting the spacing elements 27, 28, and 29 into the tube 25, the rubber sleeve 24 is inserted therein from below and the rubber sleeve 23 from above. Then, the journal 20 is pushed through the rubber sleeves 24 and 23 from below, whereupon the upper bracket 18 is fitted from above upon the end of the journal 20 and secured thereto by a nut 18''. The axial force A occurring at this time, as indicated in Fig. 2, then clamps the flanged end 32 of the rubber sleeve 23 between the washer 33 on the lower surface of the bracket 18 and the round shoulder 30 of the tube 25. The rubber then has the tendency to flow radially outwardly between the washer 33 and the shoulder 30 in the direction shown by the arrow B, thereby also weakening the compression of the rubber sleeve 23 against the cylindrical parts of the tube 25 and the journal 20.

Then, according to the invention, a clamping ring 38, shown especially in Fig. 3, which has preferably been placed around the outer surface of the flanged rubber portion 32 before the bracket 18 is fitted upon the upper end of the journal 20, is tightened by a screw 39 or similar means. It prevents the rubber from flowing radially outwardly when an axial force A is being exerted upon the journal 20 or the tubular element 25 respectively, so that the compressive force with which the rubber sleeve presses against the adjacent cylindrical surfaces will not be diminished and the entire length of the sleeve including the free portion 32 will be operative to take up not only the lateral forces but the axial forces, i. e. those exerted in a vertical direction, as well.

As previously indicated, the lower end of the tube 25 may also be provided with a rounded, projecting shoulder similar to shoulder 30 at the upper end thereof, and a restraining ring 38 may also be clamped around the free shoulder part 34 of the rubber sleeve 24. However, since the axial forces do not react upon the lower end of the rubber sleeve 24 as strongly as they do upon the upper end of sleeve 23, such expediency is not as urgently required.

While the foregoing description sets forth in detail what I regard as the preferred embodiment of my invention, it is to be understood that numerous changes may be made therein without departing from the spirit and scope of the invention as defined in the appended claims.

Having thus described my invention, what I claim as new is:

1. In combination with a wheel suspension for a motor vehicle having a frame and a tubular element secured to said frame, means for mounting said wheel suspension resiliently on said frame comprising a journal within said tubular element, said journal being subjected to forces in the axial as well as radial direction thereof, means for securing said wheel suspension to the opposite ends of said journal, means for resiliently securing said journal in the axial direction thereof within said tubular element including at least one bearing surface on said journal adjacent to but spaced from one end of said tubular element, at least one rubber sleeve mounted between said journal and said tubular element and projecting from at least one end of said element and abutting against said bearing surface, means for compressing said rubber sleeve within said tubular element so as to press against the cylindrical walls of said element and said journal as well as against said bearing surface, and separate means in juxtaposition with said bearing surface for restraining the projecting end portion of said rubber sleeve from expanding in a radial direction between the end of said tubular element and said bearing surface to effectively provide for absorption of axial forces along the entire length of said rubber sleeve.

2. In combination with a wheel suspension for a motor vehicle having a frame and a tubular element secured to said frame, means for mounting said wheel suspension resiliently on said frame comprising a journal within said tubular element, means for securing said wheel suspension to the opposite ends of said journal, means for resiliently securing said journal in axial direction thereof within said tubular element including at least one bearing surface on said journal adjacent to but spaced from one end of said tubular element, at least one rubber sleeve mounted between said journal and said tubular element, said rubber sleeve having at least one thickened, flangelike end portion projecting from at least one end of said tubular element and abutting against said bearing surface, means for compressing said rubber sleeve within said tubular element so as to press against the cylindrical walls of said element and said journal as well as against said bearing surface, and a clamping ring around said thickened end portion of said rubber sleeve for restraining the same from expanding in a radial direction between the end of said tubular element and said bearing surface.

3. In combination with a wheel suspension for a motor vehicle having a frame and a tubular element secured to said frame and extending in a substantially vertical direction, at least one end of said tubular element flaring outwardly so as to provide a shoulder having a well-rounded inner surface, means for mounting said wheel suspension on said frame comprising a journal within, and extending through, said tubular element, means for resiliently securing said journal in axial direction thereof within said tubular element, including at least one bearing surface on said journal adjacent to but spaced from one end of said tubular element, at least one rubber sleeve mounted between said journal and said tubular element, said rubber sleeve having at least one thickened, flangelike end portion projecting from at least one end of said tubular element, resting upon said flaring shoulder and abutting with its outer end against said bearing surface, means for compressing said rubber sleeve within said tubular element so as to press against the cylindrical walls of said element and said journal, as well as for compressing said thickened end portion of said rubber sleeve between said flaring shoulder and said bearing surface, and a clamping ring around said thickened end portion for restraining the same from expanding in a radial direction between said shoulder and said bearing surface.

4. In a combination with a wheel suspension for a motor vehicle having a frame and a tubular element secured to said frame and extending in a substantially vertical direction, said tubular element having an outwardly projecting flange at each end thereof, at least one of said flanges flaring gradually outwardly from the cylindrical part of said element so as to provide a well-rounded shoulder, means for mounting said wheel suspension on said frame comprising a journal within, and extending through, said tubular element, means for securing said wheel suspension to the opposite ends of said journal, means for resiliently securing said journal in axial direction thereof within said tubular element, including a pair of bearing surfaces adjacent to but spaced from the opposite ends of said tubular element, a pair of rubber sleeves mounted between said journal and said tubular element, means intermediate said journal and said tubular element for maintaining said sleeves in a spaced relation to each other, each of said rubber sleeves having a thickened, flangelike end portion projecting from the opposite ends of said tubular element, resting upon said flanges and abutting with their outer ends against said bearing surfaces, means for compressing said rubber sleeves within said tubular element so as to press against the cylindrical walls of said element and said journal, as well as for compressing said thickened end portions of said rubber sleeves between said flanges and said bearing surfaces, and a clamping ring around at least one of said thickened end portions for restraining the same from expanding in a radial direction when said compressing means are tightened or a force is exerted in an axial direction of said journal.

References Cited in the file of this patent

UNITED STATES PATENTS

| | | |
|---|---|---|
| 1,727,945 | Spreen | Sept. 10, 1929 |
| 1,729,328 | Chilton | Sept. 24, 1929 |
| 2,258,067 | Paton | Oct. 7, 1941 |
| 2,338,478 | Wulff | Jan. 4, 1944 |
| 2,611,627 | Reynolds | Sept. 23, 1952 |

FOREIGN PATENTS

| | | |
|---|---|---|
| 661,451 | Great Britain | Nov. 21, 1951 |